United States Patent [19]

Tanaka

[11] Patent Number: 4,839,856
[45] Date of Patent: Jun. 13, 1989

[54] MEMORY ACCESS CONTROL CIRCUIT
[75] Inventor: Koichi Tanaka, Kawasaki, Japan
[73] Assignee: Kabushiki Kaisha Toshiba, Kawasaki, Japan
[21] Appl. No.: 940,725
[22] Filed: Dec. 11, 1986
[30] Foreign Application Priority Data
Dec. 23, 1985 [JP] Japan .............................. 60-290209
[51] Int. Cl.⁴ ............................................ G06F 12/06
[52] U.S. Cl. .................................. 364/900; 364/957; 364/957.1; 364/959
[58] Field of Search ... 364/200 MS File, 900 MS File
[56] References Cited
U.S. PATENT DOCUMENTS

| 4,495,565 | 1/1985 | Thompson | 364/200 |
| 4,546,451 | 10/1985 | Bruce | 364/900 |
| 4,581,721 | 4/1986 | Gunawardana | 364/900 |
| 4,701,843 | 10/1987 | Cohen | 364/200 |

Primary Examiner—Gareth D. Shaw
Assistant Examiner—Rebecca L. Rudolph
Attorney, Agent, or Firm—Finnegan, Henderson, Farabow, Garrett, & Dunner

[57] ABSTRACT

Memory address signals consisting of upper and lower address signals output from a memory access circuit are retained by an address counter. An address comparator compares the upper address signal retained by the address counter and the next upper address signal from the memory access circuit. If these upper address signals coincide with each other, a multiplexer is controlled by a timing control circuit, and only the lower address signal held by the address counter is supplied to a memory via an address bus. However, if the above upper address signals do not coincide with each other, the multiplexer is controlled by the timing control circuit. In this case, the upper and lower address signals retained by the address counter are multiplexed, and the multiplexed signals are supplied to the memory via the address bus. The timing control circuit also supplies a row address strobe signal and a column address strobe signal to the memory.

6 Claims, 8 Drawing Sheets

MEMORY ACCESS CONTROL CIRCUIT

BACKGROUND OF THE INVENTION

The present invention relates to a memory access control circuit for controlling dynamic RAM access and, more particularly, to a memory access control circuit for efficiently accessing a dynamic RAM having a page or static column mode.

An address is input to a dynamic RAM (to be referred to as a DRAM hereinafter) such that address data is divided into upper and lower address signals nd these signals are time-division multiplexed. The access time in the DRAM data read mode is defined by a period required for identifying data after the upper and lower address signals are input to the DRAM. Since each address data is divided into two address signals and these signals are input to the DRAM, the access time is undesirably prolonged.

A CPU or DMA controller tends to access data having successive or adjacent addresses. In this case, data having the same upper address but different lower addresses is frequently accessed.

By utilizing the feature for updating only the lower address, page mode access or static column access is proposed to shorten the DRAM access time. The operation for reading out three address signals $(0100)_H$ to $(0102)_H$ (FIG. 1), where H represents the hexadecimal notation according to page mode access, will be described with reference to the timing chart of FIG. 2. Upper address $(01)_H$ is input to the DRAM. In response to this address, row address strobe signal $\overline{RAS}$ goes to level "0". All data corresponding to upper address $(01)_H$ is read out from memory cells in the DRAM. Lower address $(00)_H$ is then input to the DRAM. In response to this, column address strobe signal $\overline{CAS}$ goes to level "0". Only data corresponding to address $(00)_H$ is read out from the DRAM and output outside the DRAM. As a result, data A stored at address $(0100)_H$ is read out as output data.

Subsequently, second lower address $(01)_H$ is input to the DRAM. In response to this, signal $\overline{CAS}$ goes to level "0". Since all the data corresponding to address $(01)_H$ in the DRAM has been accessed, only the data corresponding to this lower address is selected from the accessed data and output outside the DRAM. Therefore, data B stored at address $(0101)_H$ of the DRAM is read out. Similarly, data is sequentially selected and output in response to the lower address inputs and falling of signal $\overline{CAS}$ to level "0" in synchronism with each lower address input.

According to page mode access, once the upper address input is supplied to the DRAM, only different lower address inputs are supplied thereto to read out desired data. Therefore, the access time for the second and subsequent read operations can be shortened.

Static column access employs the same addressing as that of page mode access. In addition, as shown in FIG. 2, signal $\overline{CAS}$ is set to be continuously active (level "0") within the period for inputting a plurality of lower addresses. Since the logical level of signal $\overline{CAS}$ need not be repeatedly changed, data access can be achieved at a higher speed.

In order to achieve high-speed access, page mode access and static column access are based on the assumption that the upper address is not frequently updated. In other words, if the upper address is frequently updated, high-speed access cannot be performed.

A conventional device (e.g., a CPU or a DMA controller) for accessing a memory does not have a function for discriminating whether or not the upper address is updated. As a result, the conventional CPU or DMA controller cannot employ a page mode access or static column access function assigned to the DRAM.

SUMMARY OF THE INVENTION

It is an object of the present invention to provide a memory access control circuit capable of effectively utilizing page mode access or static column access to realize high-speed memory access when a CPU or DMA controller accesses a memory.

In order to achieve the above object of the present invention, there is provided a memory access control circuit comprising a memory access circuit for outputting memory address data consisting of upper and lower address signals to access a memory and for requesting updating of a memory address as needed, address retaining means for retaining the upper and lower address signals output from the memory access circuit and for updating the memory address by a predetermined value on the basis of a control signal, upper address detecting means for detecting a change in upper address signal output from the memory access circuit, address switching means for sequentially switching and outputting the upper and lower address signals retained by the address retaining means, an address bus to which multiplexed upper and lower address signals output from the address switching means are transferred, a memory for receiving the multiplexed upper and lower address signals from the address bus, and control means for controlling the address switching means, to send only the lower address signal onto the address bus when an output from the upper address detecting means represents no updating of the upper address signal, and to send the sequentially switched upper and lower address signals onto the address bus when the output from the upper address detecting means represents updating of the upper address, under the condition that new address data is output from the memory access circuit or the memory access circuit requests updating of the memory address.

DETAILED DESCRIPTION OF THE PREFERRED EMBODIMENTS

Figure 3:
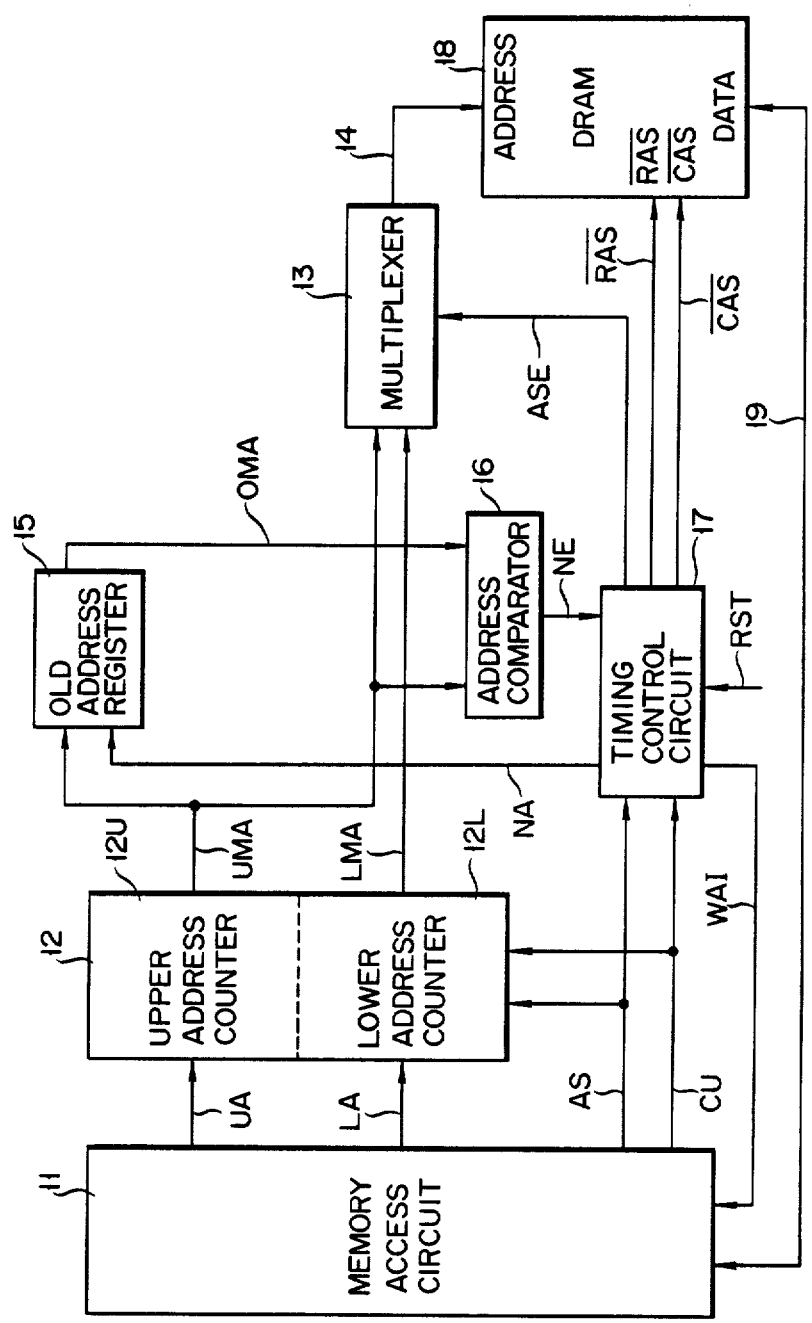
FIG. 3 is a block diagram of a memory access control circuit according to an embodiment of the present invention.

FIG. 3 is a block diagram showing a memory access control circuit according to an embodiment of the present invention. Referring to FIG. 3, reference numeral 11 denotes a memory access circuit (e.g., a CPU or a DMA controller) having a memory access function. Access circuit 11 generates upper address signal UA, lower address signal LA, address strobe signal AS, and count-up control signal CU in order to access a memory.

Upper and lower address signals UA and LA, address strobe signal AS and count-up control signal CU are supplied from memory access circuit 11 to address counter 12. Counter 12 comprises upper and lower address counters 12U and 12L for retaining the upper and lower address signals. In practice, counter 12 retains address signals UA and LA in response to strobe signal AS. When counter 12 receives signal CU, the retained value is updated by a predetermined value, e.g., incremented by one. Signals UA and LA retained in counter 12 are output as upper and lower memory address signals UMA and LMA, respectively.

Upper and lower memory address signals UMA and LMA are supplied from address counter 12 to multiplexer 13. Multiplexer 13 time-divisionally sends address signals UMA and LMA onto address bus 14 in response to address switching signal ASE (to be described later).

Upper memory address signal UMA output from address counter 12 is input to old address register 15. Upon reception of new address signal NA (to be described later), register 15 stores it as upper memory address signal UMA and outputs it as old address signal OMA.

Old address signal OMA and upper memory address UMA are input to address comparator 16. Comparator 16 compares signal OMA with signal UMA and determines a coincidence therebetween. If a noncoincidence is established, comparator 16 generates noncoincidence signal NE. Signal NE is input to timing control circuit 17.

Timing control circuit 17 also receives address strobe signal AS, count-up control signal CU, and reset signal RST. Control circuit 17 outputs address switching signal ASE, new address signal NA, row address strobe signal $\overline{RSA}$, column address strobe signal $\overline{CAS}$, and wait signal WAI on the basis of the above input signals. Signal WAI is input to memory access circuit 11. Signals $\overline{RAS}$ and $\overline{CAS}$ are input to DRAM 18.

DRAM 18 is connected to address bus 14. DRAM 18 and memory access circuit 11 are connected via data bus 19.

The operation of the memory access control circuit having the arrangement described above will be described with reference to timing charts in FIGS. 4 and 5.

Figure 4:
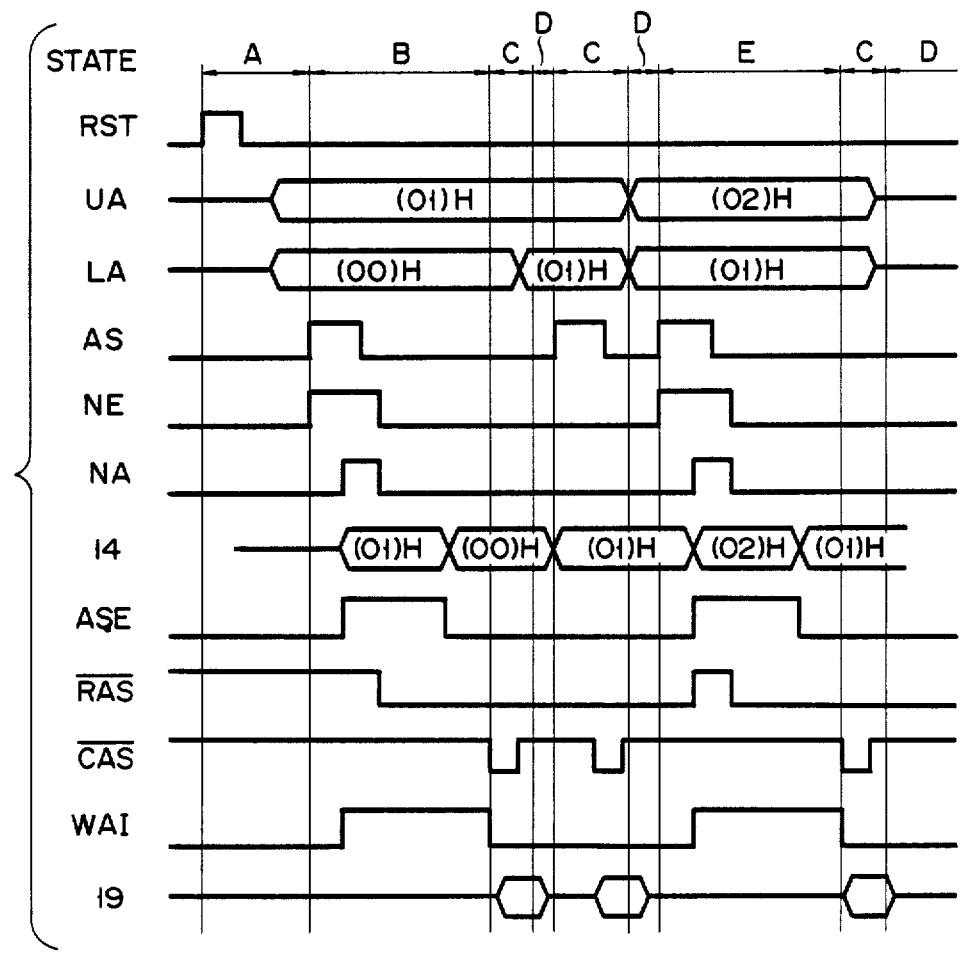
FIGS. 4 and 5 are timing charts for explaining the memory access control circuit in FIG. 3.

The timing chart in FIG. 4 shows the sequence wherein memory access circuit 11 sequentially accesses three addresses $(0100)_H$, $(0101)_H$, and $(0201)_H$ after reset signal RST is input to timing control circuit 17.

After reset signal RST is input, first data for address $(0100)_H$ is output from memory access circuit 11. In response to this address signal output, address strobe signal AS goes to level "1". The address output from access circuit 11 is divided into upper and lower address signals UA and LA. Signal UA has an address value of $(01)_H$, and signal LA has an address value of $(00)_H$. In response to address strobe signal AS, address counter 12 retains these signals UA and LA. In this case, the address data is not retained in old address register 15, and its value is indefinite. For this reason, the result of comparison between signals UMA and OMA by address comparator 16 results in a noncoincidence, so that comparator 16 outputs noncoincidence signal NE. Since signal AS is input for the first time upon resetting, control circuit 17 outputs new address signal NA. Upon reception of signal NA, register 15 stores and retains address signal UMA having a value of $(01)_H$.

After resetting, address switching signal ASE is set to be level "1" by timing control circuit 17. When signal ASE goes to level "1", multiplexer 13 switches to upper memory address $(01)_H$ received from address counter 12 during this period and outputs it onto address bus 14. Subsequently, signal ASE is set at level "0" in timing control circuit 17. Then, multiplexer 13 switches to lower memory address $(00)_H$ received from address counter 12 and outputs it onto address bus 14.

As shown in FIG. 4, at timings when upper and lower address signals for addresses $(01)_H$ and $(00)_H$ are sent onto address bus 14, signals $\overline{RAS}$ and $\overline{CAS}$ sequentially go to level "0", thereby causing DRAM 18 to receive signals for addresses $(01)_H$ and $(00)_H$. Thereafter, data is read out on the basis of the received upper and lower memory address signals. The readout data is transferred to memory access circuit 11 through data bus 19.

Subsequently, second data for address $(0101)_H$ is output from memory access circuit 11, and address strobe signal AS is output in response thereto. The address data is divided into upper and lower address signals UA and LA in the same manner as described above. However, at this time, address register 15 retains signal UMA for previous upper memory address signal $(01)_H$. This address signal UMA coincides with old address signal OMA, and address comparator 16 does not output noncoincidence signal NE. In this case, timing control circuit 17 does not output new address signal NA. The retained value of register 15 is kept unchanged. In control circuit 17, address switching signal ASE is kept at level "0", and only signal $\overline{CAS}$ goes to level "0". Multiplexer 13 then switches to lower memory address $(01)_H$ received from counter 12 and outputs it onto address bus 14. On the basis of signal $\overline{CAS}$, DRAM 18 receives signal LA for lower memory address $(01)_H$. Thereafter, data is read out from DRAM 18 by a combination of signals UA and LA, respectively, for upper and lower memory addresses $(01)_H$ and $(01)_H$. The readout data is transferred to memory access circuit 11 via data bus 19.

DRAM 18 is accessed by outputting only lower memory address signal LMA onto address bus 14 when upper address signal UA is not updated.

Third data for address $(0201)_H$ is output from memory access circuit 11. In this case, signal UA for upper address $(02)_H$ and signal LA for lower address $(01)_H$ are sent to address counter 12. Old address register 15 retains signal UMA for previous upper memory address $(01)_H$. No coincidence is established between signal UMA and old address OMA, and address comparator 16 outputs noncoincidence signal NE. Upon reception of signal NE, timing control circuit 17 outputs new address signal NA. Old address register 15 receives signal UMA for upper memory address and old address signal OMA is updated. Thereafter, control circuit 17 sets signal $\overline{RAS}$ to level "1", signifying that page mode access of DRAM 18 has been completed. In control circuit 17, address switching signal ASE is set at level "1", and then signal $\overline{RAS}$ goes to level "0" again, thus signifying that new page mode access of DRAM 18 has started. While signal ASE is set at level "1", multiplexer 13 switches to signal UMA for upper memory address $(02)_H$ and outputs it onto address bus 14. DRAM 18 receives signal UMA in response to signal $\overline{RAS}$. Subsequently, in timing control circuit 17, address switching signal ASE goes to level "0". For the period of this logic level, multiplexer 13 switches to signal UMA for lower memory address $(01)_H$ received from counter 12 and outputs it onto address bus 14. Thereafter, in control circuit 17, signal $\overline{CAS}$ goes to level "0". DRAM 18 receives signal LMA for lower memory address $(01)_H$ in response to signal $\overline{CAS}$. Data is read out from DRAM 18 by a combination of signals UA and LA, respectively, for upper and lower addresses $(02)_H$ and $(01)_H$. The readout data is transferred to memory access circuit 11 via data bus 19.

Timing control circuit 17 outputs wait signal WAI when multiplexer 13 supplies upper memory address signal UMA onto address bus 14, signalling to memory access circuit 11 that the access time of DRAM 18 is prolonged. When signal WAI is input to memory access circuit 11, circuit 11 prolongs current upper and lower address signals UA and LA so as to compensate for the access time of DRAM 18.

In this manner, when upper address signal UA is changed, new upper memory address signal UMA is input to DRAM 18, and new page mode access is performed.

Figure 5:
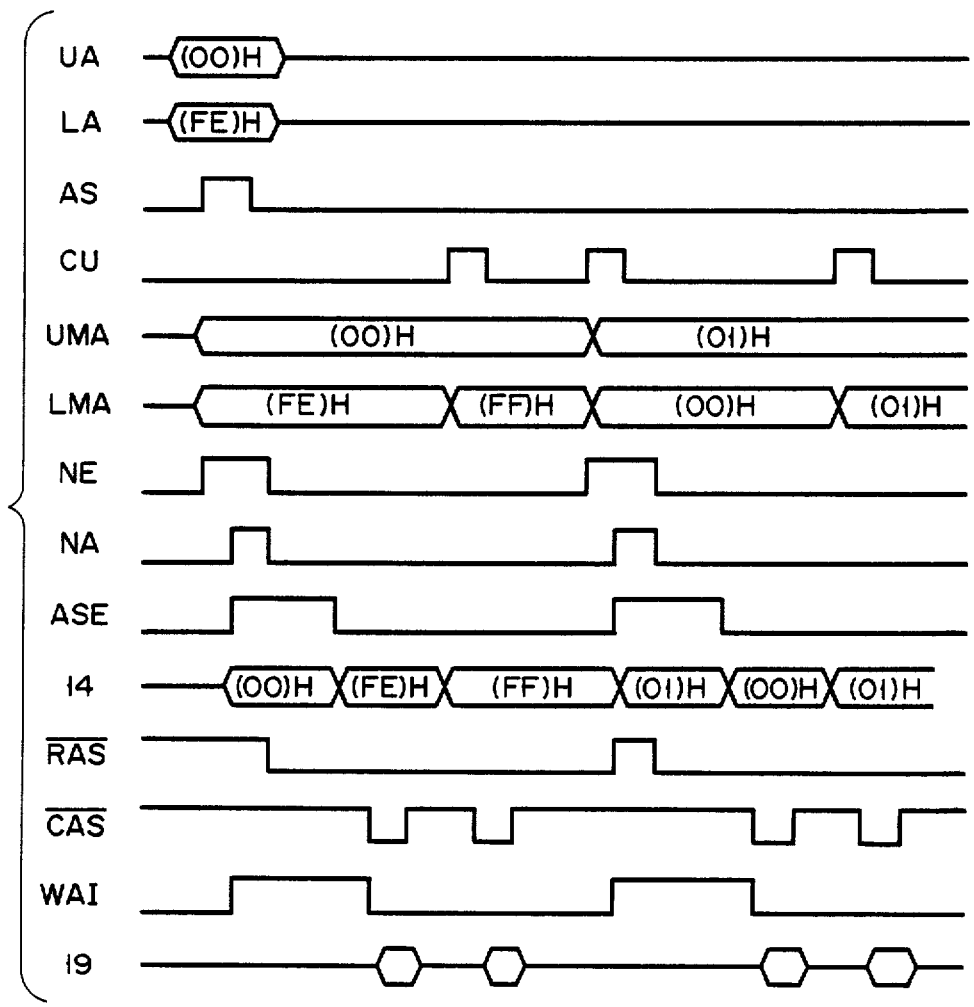

The timing chart in FIG. 5 explains the operation wherein memory access circuit 11 sequentially accesses successive addresses from $(00FE)_H$.

Memory access circuit 11 outputs first data for address $(00FE)_H$ and address strobe signal AS. This output operation is the same as that in the timing chart of FIG. 4, and a detailed description thereof will be omitted.

In order to access the next address $(00FF)_H$, count-up control signal CU is output from memory access circuit 11. When signal CU is received by timing control circuit 17, the prestored address signal value is incremented by one in address counter 12. Signal LMA retained and output from counter 12 is updated from lower memory address $(FE)_H$ to lower memory address $(FF)_H$. In this case, signal UM for upper memory address $(00)_H$ is not changed. Address comparator 16 does not output noncoincidence signal NE. For this reason, the same access as that using only lower memory address signal LMA (FIG. 4) is performed.

In order to access the next address $(0100)_H$, memory access circuit 11 outputs count-up control signal CU. Address counter 12 increments lower address signal LA value by one, so that address $(FF)_H$ is updated to $(00)_H$. At the same time, a carry from the lower address causes updating of upper address $(00)_H$ to $(01)_H$. Since the value of upper memory address signal UMA is changed, address comparator 16 outputs noncoincidence signal NE. The access operation is performed in the same manner as the case wherein higher memory address signal UAM is changed in the timing chart of FIG. 4. More specifically, new upper memory address signal UMA and lower memory address LMA are time-divisionally output to address bus 14, and thus DRAM 18 is accessed. Thereafter, whenever the next address is accessed, memory access circuit 11 outputs count-up control signal CU. If address signal UMA is not changed upon incrementation of the retained value of address counter 12, only address signal LMA is used to access DRAM 18. However, if address signal UMA is changed, both new signal UMA and signal LMA are used to access DRAM 18.

In successive addressing in the circuit of the above embodiment, upper memory address signal UMA is supplied to DRAM 18 only when upper memory address signal UMA is changed. Otherwise, only lower memory address signal LMA is supplied to DRAM 18, thereby performing page mode access and hence achieving high-speed access of DRAM 18.

Static column access for high-speed access of DRAM 18 is different from page mode access in the manner of generating column address strobe control signal $\overline{CAS}$. If updating of the memory address signal output from memory access circuit 11 can be detected, DRAM 18 can be accessed according to static column access.

Figure 1:
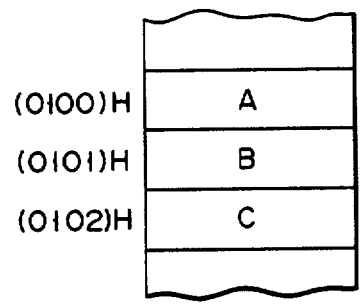
FIG. 1 is a memory map showing a state of data stored in a memory.
Figure 2:
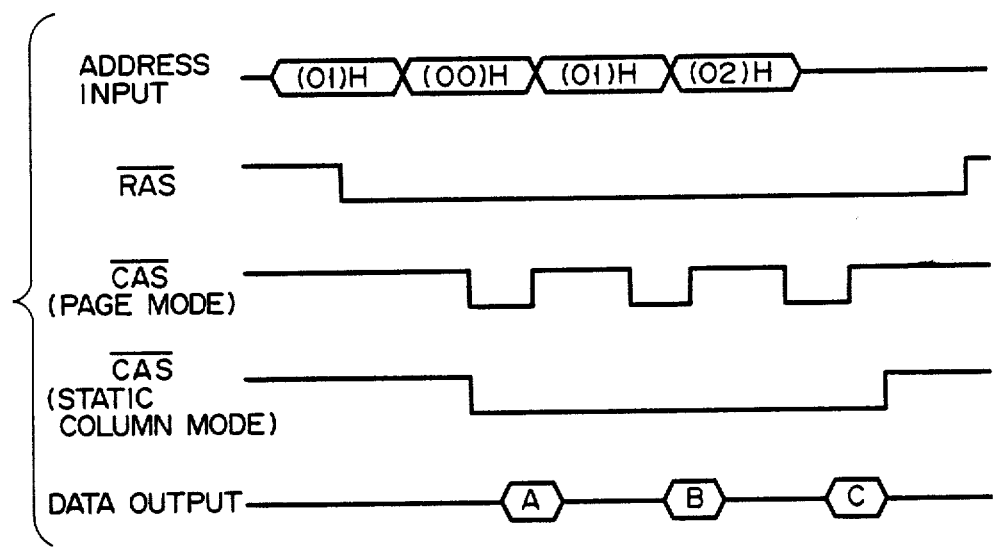
FIG. 2 is a timing chart for explaining the read operation for reading out data from the memory.
Figure 6:
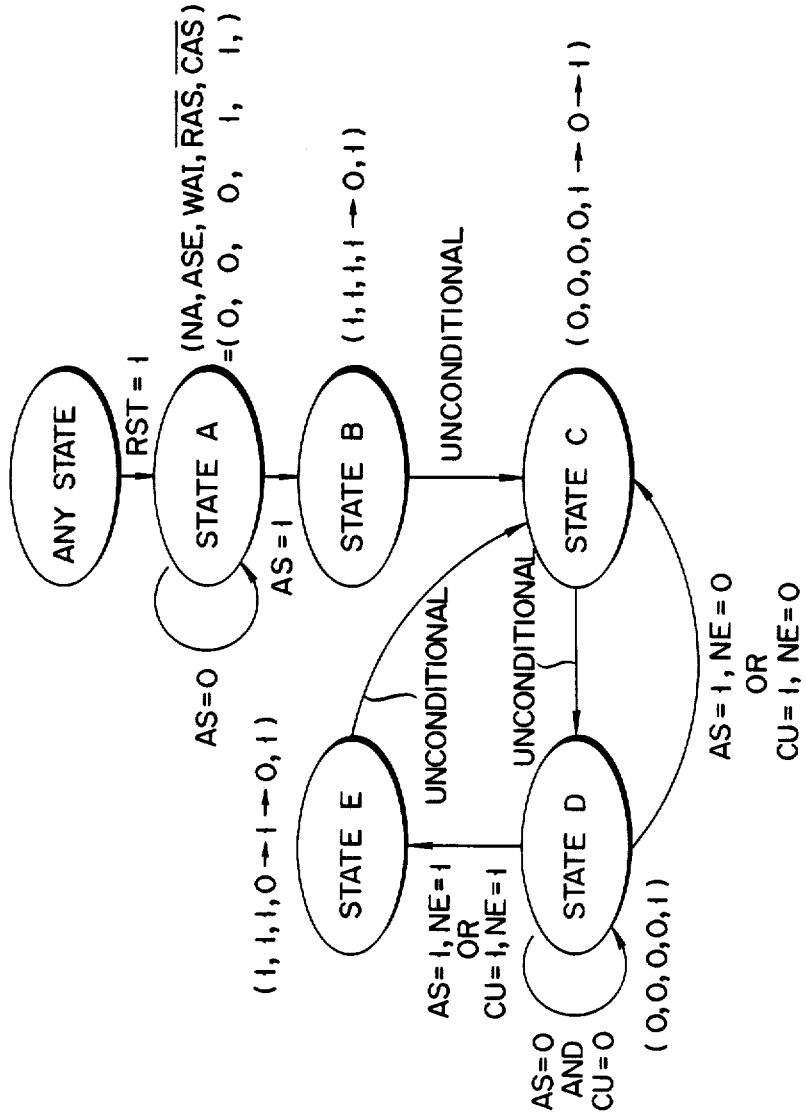
FIG. 6 is a state transition diagram of a timing control circuit in the memory access control circuit of FIG. 3.

FIG. 6 is a state transition diagram of timing control circuit 17 by control page mode access. States A to E in FIG. 6 correspond to those in FIG. 2. The timings of various signals are shown in FIG. 6. In a given state, each signal is updated from logic "0" to logic "1", and vice versa. For illustrative convenience, if a signal takes logic "1" in the given state, it is simply represented by 1. If a signal does not take logic "1" in the given state, it is represented by 0. Since changes in logic levels of signals $\overline{RAS}$ and $\overline{CAS}$ are very important, representations 0→1 or 1→0 are employed. Referring to FIG. 6, in any state, when reset signal RST is input (RST=1), state A is initialized. In state A, various signals NA, ASE, WAI, $\overline{RAS}$, and $\overline{CAS}$ are respectively set to be 0, 0, 0, 1, and 1. In state A, if signal AS is set at level "0" (AS=0), state A continues. However, if signal AS is set at level "1" (AS=1), state A is transited to state B. In state B, signals NA, ASE, WAI, $\overline{RAS}$, and $\overline{CAS}$ are respectively set to be 1, 1, 1, 1→0, and 1. State B is unconditionally transited to state C.

In state C, signals NA, ASE, WAI, $\overline{RAS}$, and $\overline{CAS}$ are respectively set to be 0, 0, 0, 0, and 1→0→1. State C is unconditionally transited to state D. In state D, signals NA, ASE, WAI, $\overline{RAS}$, and $\overline{CAS}$ are respectively set to be 0, 0, 0, 0, and 1. In state D, if signal AS is set at level "0" and signal CU is also set at level "0" (AS=0 and CU=0), state D continues. However, if AS=1 and NE=1 or if CU=1 and NE=1, state D is transited to state E. If AS=1 and NE=0 or if CU=1 and NE=0, state D is transited to state C. In state E, signals NA, ASE, WAI, $\overline{RAS}$, and $\overline{CAS}$ are respectively set to be 1, 1, 1, 0→1→0, and 1. State E is unconditionally transited to state C. Control of timing control circuit 17 is performed according to page mode access.

Figure 7:
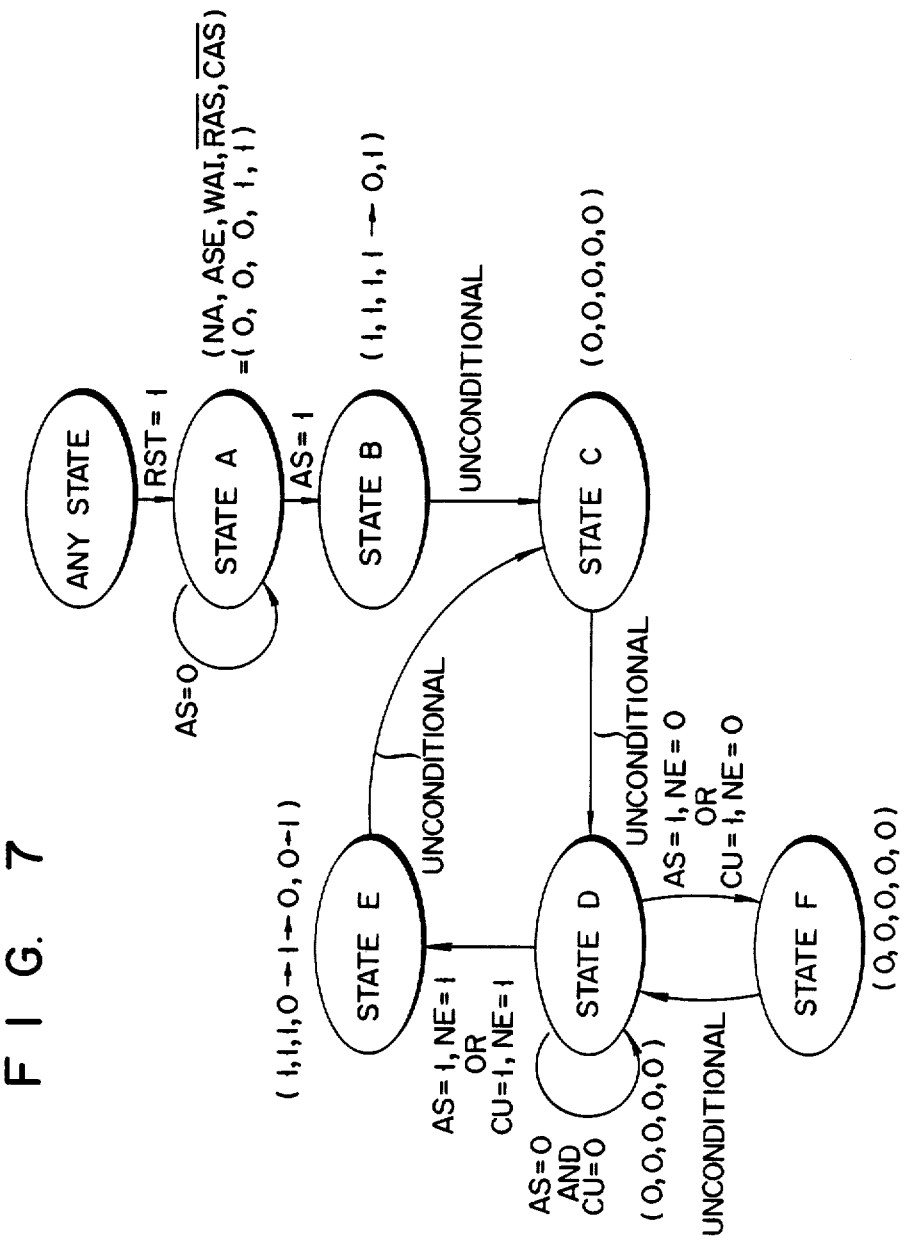
FIG. 7 is another state transition diagram of the timing control circuit in the memory access control circuit of FIG. 3.

FIG. 7 is a state tradition diagram of timing control circuit 17 so as to control static column mode access. Referring to FIG. 7, in any state, if reset signal RST is input, state A is initialized. In state A, signals NA, ASE, WAI, $\overline{RAS}$, and $\overline{CAS}$ are respectively set to be 0, 0, 0, 1, and 1. In state A, if signal AS is set at level "0", state A continues. However, if signal AS goes to level "1", state A is transited to state B. In state B, signals NA, ASE, WAI, $\overline{RAS}$, and $\overline{CAS}$ are respectively set to be 1, 1, 1, 1→0, and 1. State B is unconditionally transited to state C.

In state C, signals NA, ASE, WAI, $\overline{RAS}$, and $\overline{CAS}$ are respectively set to be 0, 0, 0, 0, and 0. State C is unconditionally shifted to state D. In state D, signals NA, ASE, WAI, $\overline{RAS}$, and $\overline{CAS}$ are respectively set to be 0, 0, 0, 0, and 0. In state D, if signal AS is set at level "0" and signal CU is set at level "0" (AS=0 and CU=0), state D continues. However, if AS=1 and NE=1 or if CU=1 and NE=1, state D is transited to state E. If AS=1 and NE=0 or if CU=1 and NE=0, state D is transited to state F. In state E, signals NA, ASE, WAI, $\overline{RAS}$, and $\overline{CAS}$ are respectively set to be 1, 1, 1, 0→1→0, and 0→1. State E is unconditionally transited to state C. In state F, signals NA, ASE, WAI, RAS, and $\overline{CAS}$ are respectively set to be 0, 0, 0, 0, and 0. State F is unconditionally transited to state D. In this manner, control of timing control circuit 17 is performed according to static column mode access.

Figure 8:
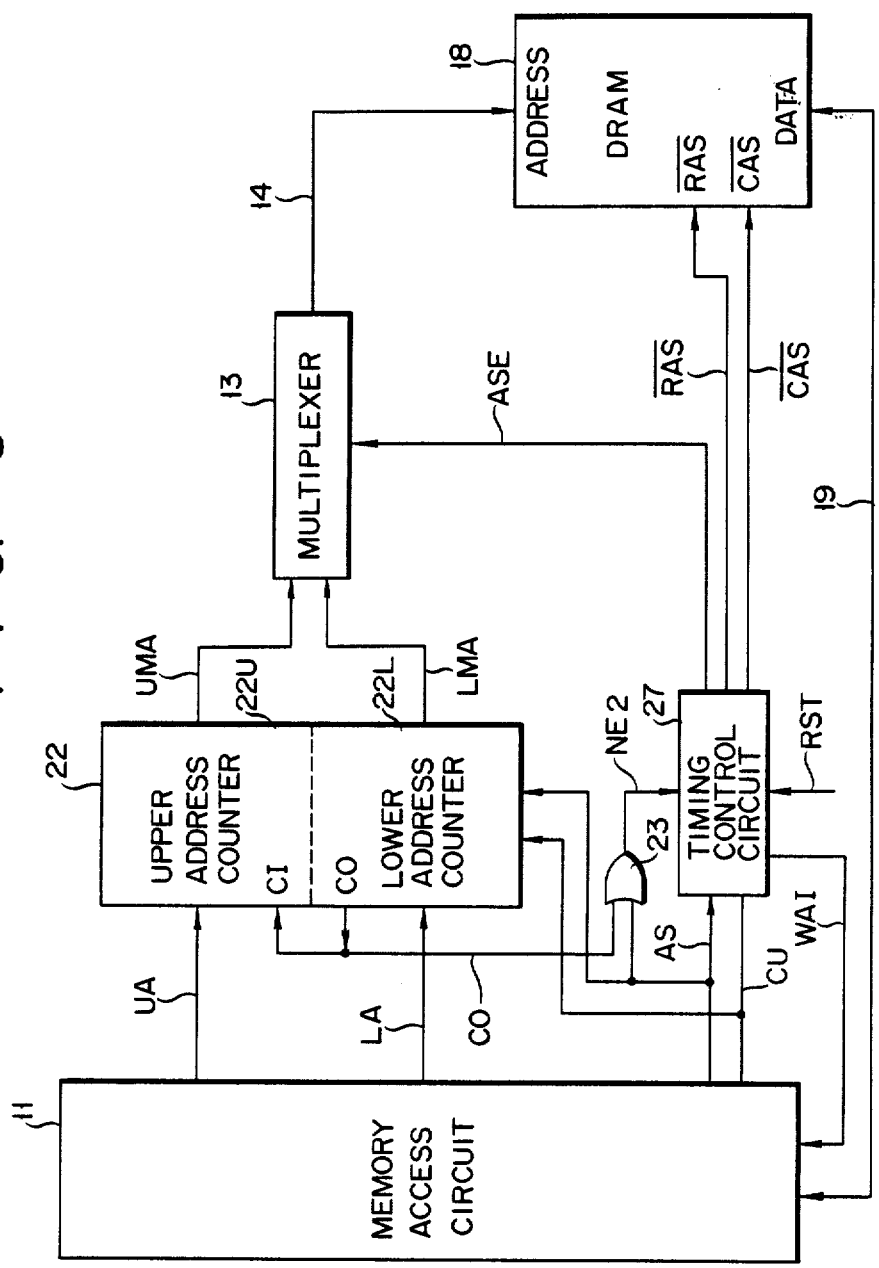
FIG. 8 is a block diagram of a memory access control circuit according to another embodiment of the present invention.

FIG. 8 is a block diagram of a memory access control circuit according to another embodiment of the present invention.

The embodiment in FIG. 8 is different from that in FIG. 3 in the following points. Address counter 22 capable of outputting outside the circuit carry output signal CO upon updating of the lower address signal is arranged in place of address counter 12. Old address register 15 and address comparator 16 are omitted, and instead OR gate 23 is arranged to receive address strobe signal AS and carry signal CO from counter 22. Noncoincidence signal NE2 from OR gate 23 is input to timing control circuit 27 used in place of timing control circuit 17. Control circuit 27 receives address strobe signal AS, count-up control signal CU, and reset signal RST in addition to signal NE2. On the basis of these input signals, control circuit 27 generates address switching signal ASE, row address strobe signal $\overline{RAS}$, column address strobe signal $\overline{CAS}$, and wait signal WAI. Counter 22 comprises upper and lower address counters 22U and 22L.

Figure 9:
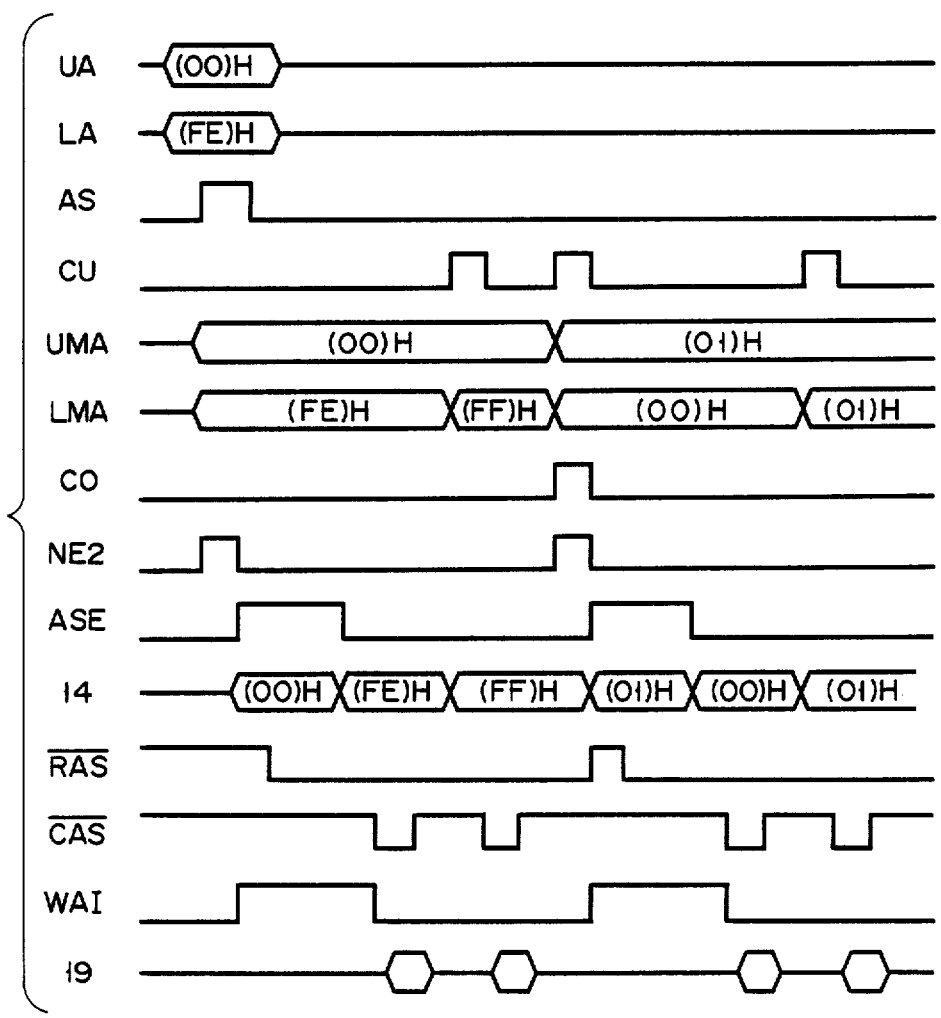
FIG. 9 is a timing chart for explaining the operation of the memory access control circuit in FIG. 8.

The operation of the memory access control circuit having the arrangement described above will be described with reference to a timing chart of FIG. 9.

First data of address $(00FE)_H$ from memory access circuit 11 is divided into upper and lower address signals UA and LA, and signals UA and LA are output therefrom. In response to these signals, access circuit 11 outputs address strobe signal AS. Signal AS is input to OR gate 23 so that gate 23 then outputs noncoincidence signal NE2. Whenever access circuit 11 outputs signal AS, OR gate 23 outputs signal NE2. Multiplexer 13 switches upper and lower address signals UMA and LMA for every signal NE2 so that address signals selectively appear on address bus 14. DRAM 18 receives address data on the basis of signals $\overline{RAS}$ and $\overline{CAS}$ output from timing control circuit 27. Data access is performed in response to such addressing.

If memory access circuit 11 accesses second data for address $(00FF)_H$ next to address $(00FE)_H$, circuit 11 outputs only count-up control signal CU. Upon reception of signal CU, only the value of lower address signal LA is incremented by one in address counter 22 so that the lower address is updated from $(FE)_H$ to $(FF)_H$. In this case, no carry signal CO is generated by lower address counter 22L, and noncoincidence signal NE2 is not output from OR gate 23. In the same manner as in the case wherein upper memory address signal UMA is not changed in the timing chart of FIG. 4, DRAM 18 is accessed by only lower memory address signal LMA.

Subsequently, when memory access circuit 11 outputs third data for address $(0100)_H$ next to address $(00FF)_H$, access circuit 11 outputs only count-up control signal CU. Upon reception of signal CU, the value of lower address signal LA is incremented by one in address counter 22 so that the lower address is updated from $(FF)_H$ to $(00)_H$. In addition, carry signal CO from lower address counter 22L updates the upper address from $(00)_H$ to $(01)_H$. Since signal CO is input to OR gate 23, non-coincidence signal NE2 is output from OR gate 23 later. In this case, in the same manner as in the case wherein upper memory address signal UMA is changed in the timing chart of FIG. 4, new upper memory address signal UMA and lower memory address signal LMA are time-division multiplexed onto address bus 14. DRAM 18 is thus accessed by new page mode access.

In the memory access control circuit of each embodiment described above, the upper address signal is supplied to a memory (e.g., a DRAM) using a multiplexed address signal only when the upper address is updated. Thus, the upper address signal is not output when the upper address is not updated. Therefore, page mode access or static column access for shortening access time can be performed. Furthermore, since retaining and incrementing means of the memory address are arranged, page mode access or static column access can be performed such that only the start address is specified to access succeeding addresses and thereafter count-up control signal CU is output from memory access circuit 11.

The present invention is not limited to the particular embodiments described above. Various changes and modifications may be made within the spirit and scope of the invention. In each embodiment described above, data read access for DRAM 18 is exemplified. However, page mode access or static column access may be effectively utilized in the write mode of DRAM 18 in the same manner as in the read mode.

In the embodiment of FIG. 3, counter 12 has its count incremented by one every time it receives signal CU from memory access circuit 11. Instead, counter 12 can be replaced by a incremented by any other value every time it receives signal CU, said value being determined by another signal from memory access circuit 11.

What is claimed is:

1. A memory access control circuit comprising:
   a memory access circuit for outputting memory address data consisting of upper and lower address data, an address strobe signal, and a count-up control signal for requesting the updating of a memory address, said upper address representing a memory row address, and said lower address representing a memory column address;
   address retaining means, responsive to said memory access circuit, including an upper address counter and a lower address counter, for retaining said upper and lower address data, respectively, when said memory access circuit outputs said address strobe signal, and for updating said retained memory address data by a predetermined value when said memory access circuit outputs said count-up control signal;
   upper address retaining means for retaining the value of said upper address data retained in said upper address counter prior to the updating of said retained memory address data;
   signal output means for comparing said upper address data retained in said upper address counter with said upper address data retained by said upper address retaining means, and for outputting a non-coincidence signal when said compared addresses are not identical;
   an address bus;

address switching means for sequentially switching and outputting to said address bus said upper and lower address data retained by said upper and lower address counters;

a memory for receiving from said address bus said upper and lower address data output from said address switching means, said upper and lower address data being used as a row address signal and a column address signal, respectively; and control means, operational in response to said address strobe signal or said count-up control signal for controlling said address switching means to output said lower address data from said lower address counter to said address bus when said signal output means does not output said non-coincidence signal, and to output said upper and lower address data from said upper and lower address counters to said address bus when said signal output means outputs said non-coincidence signal, and for outputting a wait signal when said signal outputting means does not output said non-coincidence signal, said wait signal causing said memory access circuit to prolong the period during which said memory address data is output.

2. The memory access control circuit of claim 1 wherein said memory comprises a dynamic RAM (DRAM).

3. A memory access control circuit according to claim 1, wherein said control means outputs a row address strobe signal to said memory in response to said upper address data transferred on said address bus, and outputs a column address strobe signal to said memory in response to said lower address data transferred on said address bus.

4. A method of controlling memory access comprising the steps of:
outputting, from a memory access circuit, memory address data comprising upper and lower address data, an address strobe signal, and a count-up control signal for requesting the updating of a memory address;

retaining in an address counter having an upper address counter and a lower address counter responsive to said memory access circuit, said upper and lower address data, respectively, when said memory access circuit outputs said address strobe signal, and for updating said retained memory address data by predetermined value when said memory access circuit outputs said count-up control signal;

retaining, in an old address register, the value of said upper address data retained in said upper address counter prior to updating of said retained memory address data;

comparing, in an address comparator, said upper address data retained in said upper address counter with said upper address data retained by said old address register, and outputting a non-coincidence signal when said compared addresses are not identical;

sequentially switching and outputting, from an address switching multiplexer to said address bus, said upper and lower address data retained by said upper and lower address counters;

receiving in a memory, from said address bus, said upper and lower address data output from said address switching multiplexer, said upper and lower address data being used as a row address signal and a column address signal, respectively; and controlling said address switching multiplexer with a timing control circuit operational in response to said address strobe signal or said count-up control signal to output said lower address data from said lower address counter to said address bus when said address comparator does not output said non-coincidence signal, and to output said upper and lower address data from said upper and lower address counters to said address bus when said address comparator outputs said non-coincidence signal, and for outputting a wait signal when said address comparator does not output said non-coincidence signal, said wait signal causing said memory access circuit to prolong the period during which said memory address data is output.

5. The method of claim 4 wherein said memory is a dynamic RAM (DRAM).

6. The method of claim 4 wherein said step of controlling includes a step of outputting from said timing control circuit a row address strobe signal to said memory in response to said upper address data transferred from said address switching multiplexer, and a step of outputting from said timing control circuit a column address strobe signal to said memory in response to said lower address data output to said address bus by said address switching multiplexer.

* * * * *